United States Patent [19]

Berger

[11] Patent Number: 5,474,164
[45] Date of Patent: Dec. 12, 1995

[54] VEHICLE TRANSMISSION HILL HOLDER

[75] Inventor: Alvin H. Berger, Brownstown, Mich.

[73] Assignee: Ford Motor Company, Dearborn, Mich.

[21] Appl. No.: 239,806

[22] Filed: May 9, 1994

[51] Int. Cl.⁶ ............................................. B60K 41/26
[52] U.S. Cl. ....................... 192/7; 192/4 A; 192/4 C
[58] Field of Search ............................ 192/4 A, 4 C, 192/7

[56] References Cited

U.S. PATENT DOCUMENTS

| | | | |
|---|---|---|---|
| 1,204,375 | 11/1916 | Neal | 192/4 A |
| 1,625,571 | 4/1927 | Shinkle | 192/4 A |
| 2,037,198 | 4/1936 | Moody | 192/4 A |
| 2,050,759 | 8/1936 | Lyons | 192/4 A |
| 2,296,619 | 9/1942 | Rauen | 192/4 A |
| 3,923,127 | 12/1975 | Radcliffe et al. | |
| 4,515,259 | 5/1985 | Ha | |
| 4,650,046 | 3/1987 | Parsons | |
| 4,660,691 | 4/1987 | Messersmith et al. | |
| 4,799,395 | 1/1989 | Janiszewski | |
| 4,811,655 | 3/1989 | Janiszewski | |
| 4,867,291 | 9/1989 | Holman et al. | |
| 5,170,679 | 12/1992 | Merkle | |
| 5,172,797 | 12/1992 | Stout et al. | |

*Primary Examiner*—Richard M. Lorence
*Attorney, Agent, or Firm*—Donald A. Wilkinson; Roger L. May

[57] ABSTRACT

A hill hold mechanism for use in a motor vehicle transmission. The mechanism includes a one-way clutch coupled to a transmission input shaft, a toggle link with a friction pad coupled to the transmission output shaft, and a friction band, coupled to the one-way clutch, for locking the one-way clutch when the toggle link and the friction pad react to a change in rotational direction of the output shaft. With this mechanism, when a vehicle is stopped on an incline and the vehicle attempts to roll down the incline, the one-way clutch is engaged and prevents rolling, but will not prevent the vehicle from moving in the driven direction when the vehicle engine begins to power it.

19 Claims, 1 Drawing Sheet

VEHICLE TRANSMISSION HILL HOLDER

FIELD OF THE INVENTION

The present invention relates to a motor vehicle transmission and more particularly to a transmission for a motor vehicle that includes a hill hold device.

BACKGROUND OF THE INVENTION

A typical problem that is encountered by motor vehicle drivers, in vehicles with manual transmissions, when they find themselves stopped on an incline and want to begin moving again, is that the vehicle begins to roll in the unwanted direction when the brake pedal is released. A conventional gearbox with an ordinary disc clutch between the gearbox and the engine does not prevent the automobile from rolling backward when starting on this upward incline as does a typical automatic transmission.

As a result, in a vehicle with a manual transmission, the hand-brake is typically used when starting on an incline. This procedure is awkward at times because the vehicle immediately moves backward once the foot on the brake pedal is lifted. When performing this procedure, the driver will normally position one foot on the clutch pedal to disengage the transmission and the other foot on the brake pedal to hold the vehicle stationary on the incline. When it is time to continue up the incline, the handbrake is engaged and the foot on the brake pedal is moved to the accelerator pedal to increase the engine speed at the same time the clutch pedal begins to return to its rest position. The handbrake is then released as the accelerator pedal is pressed. It is important to carefully coordinate the release of the hand brake with depressing the accelerator pedal and letting up of the clutch pedal in order to prevent the vehicle from initially rolling back down or stalling the engine. Also, some vehicles do not have a hand brake, and, therefore, a driver cannot perform this procedure.

Many drivers consider this to be a very difficult maneuver and therefor choose when starting on an upward incline to ride the clutch; i.e., the throttle is opened slightly over idle speed and the clutch pedal is engaged so that the clutch slips just enough to hold the vehicle stationary. This driving technique results in heavy wear on the clutch disc and, when used often, results in substantial shortening of the life of the clutch disc.

As a result, a hill holder device is desirable in a vehicle equipped with a manual transmission since this type of device prevents unwanted roll-back of a vehicle on an incline. Various types of hill holder devices have been proposed to inhibit this unwanted movement of a vehicle.

It is also desirable to have a hill hold device that will assist a driver who stops while backing up and wants to continue backing up an incline without rolling forward as the brake pedal is released.

The need arises, then, with a vehicle having a manual transmission and a conventional disc clutch, to prevent the vehicle from rolling backward when starting to move forward again on an upward incline, and to prevent the vehicle from rolling forward when starting to back up again on a downward incline, while keeping the device as simple and reliable as possible.

SUMMARY OF THE INVENTION

In its embodiments, the present invention contemplates a hill holder mechanism for a vehicle transmission, with the transmission having an input shaft coupled through a clutch to the vehicle engine and an output shaft coupled to the vehicle drive wheels. The hill holder mechanism includes a disengageable clutch mechanism, coupled to the input shaft, for permitting rotation of the input shaft in only one direction when engaged, and in both directions when disengaged, and an actuating mechanism, coupled to the output shaft, for sensing a change in rotational direction of the output shaft. The hill holder mechanism further includes a locking mechanism for selectively engaging the clutch mechanism when the actuating mechanism senses the change in rotational direction of the output shaft.

Accordingly, an object of the present invention is to provide a simple and reliable hill hold mechanism coupled to a manual transmission of a vehicle that will allow a driver of the vehicle to begin movement from a stop on an incline while preventing the vehicle from rolling in the direction opposite to the intended direction of travel.

An advantage of the present invention is that the hill hold mechanism will inhibit roll of a vehicle in the direction opposite to the vehicle travel after stopping on an incline, while still allowing the transmission input shaft to freely rotate in the engine driven direction of rotation.

DETAILED DESCRIPTION OF THE PREFERRED EMBODIMENTS

Figure 1:
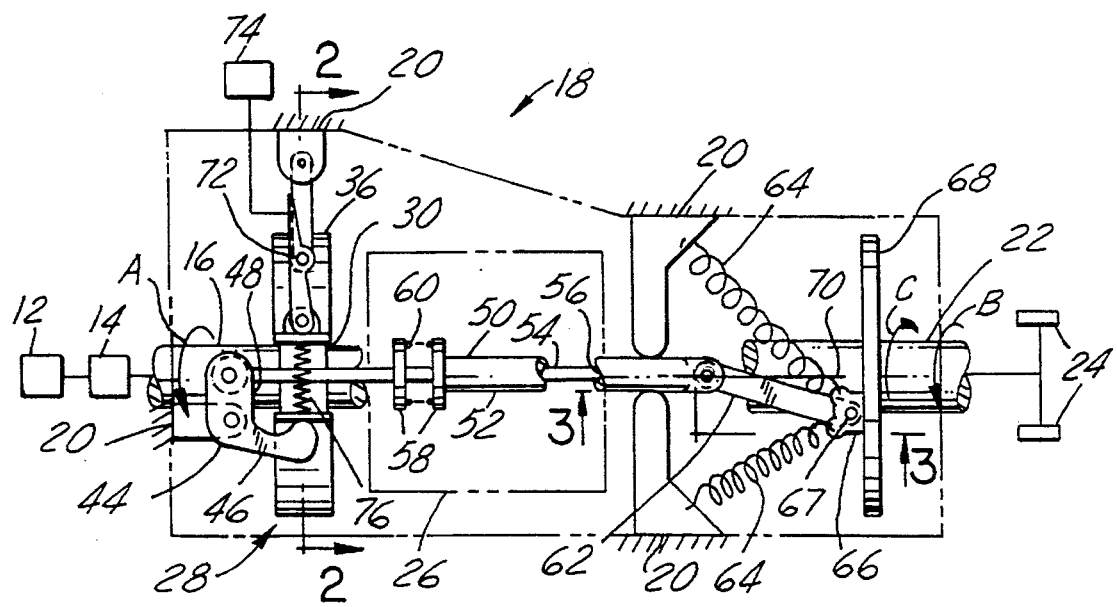
FIG. 1 is a schematic view of a hill holder mechanism in a vehicle in accordance with the present invention.

FIG. 1 schematically shows a vehicle having an engine 12 drivingly coupled to a manual clutch 14, which is in turn coupled to an input shaft 16 received within a housing 20 of a manual transmission 18. An output shaft 22 protrudes from housing 20 and drivingly cooperates with driven wheels 24. Input shaft 16 is reversibly coupled to and drives output shaft 22 through a gear train 26.

Figure 2:
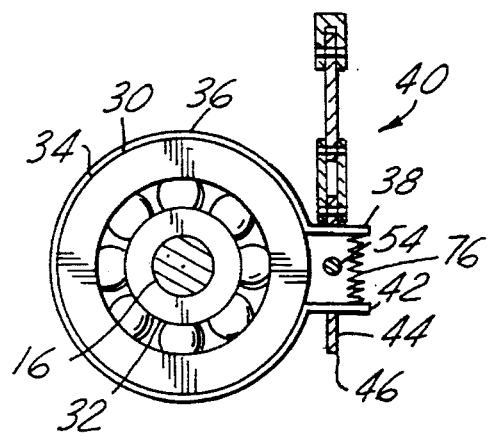
FIG. 2 is a sectional view taken along line 2—2 in FIG. 1.
Figure 3:
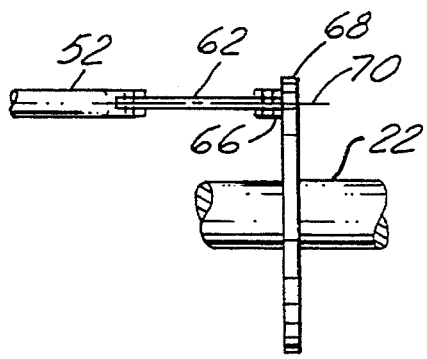
FIG. 3 is a sectional view taken along line 3—3 in FIG. 1.

Hill hold device 28 is preferably enclosed in housing 20, and is shown in FIGS. 1–3. A one-way clutch 30 is mounted to input shaft 16. One-way clutch 30 requires lubrication, so it is preferably located within transmission housing 20 along with gear train 26. One-way clutch 30 includes an inner member 32 fixed about input shaft 16, which is, in turn, rotationally coupled to an outer member 34. Outer member 34 is coupled to inner member 32 such that the two members can only rotate relative to each other in one direction. Preferably, one-way clutch 30 is a sprag clutch, although it could also employ a ratchet wheel or other type of one-way mechanism instead.

Friction band 36 is fitted around outer member 34. A first end 38 of friction band 36 is secured to and held by housing 20 through a support and disable link 40. A second end 42 of friction band 36 is in surface contact with a first arm 46 of a bell crank 44. Preferably, an auxiliary spring 76 is mounted between first end 38 and second end 42 of friction band 36 to bias the two ends away from each other. Bell crank 44 is pivotally mounted to housing 20.

When first arm 46 of bell crank 44 is pressed against second end 42 of friction band 36, friction band 36 is tightened around outer member 34, preventing rotation between the two. However, outer member 34 can rotate freely in either direction when it is not restrained. On the other hand, when outer member 34 is restrained from movement, since the inner member 32 can only rotate in one direction relative to outer member 34, it too can only rotate in only one direction. And, since inner member 32 is rotationally fixed relative to input shaft 16, it will also allow input shaft 16 to rotate in only one direction.

One-way clutch 30 is designed such that the one-way direction of rotation corresponds with the engine driven direction of rotation of input shaft 16, designated A in FIG. 1. Input shaft 16 is prevented from rotation in the opposite direction when friction band 36 is engaged about outer member 34, locking it in place. If gear train 26 is in a forward gear arrangement, rotation of input shaft 16 in the direction of A causes a rotation of output shaft 22 in direction B; and if gear train 26 is in a reverse gear arrangement, rotation of input shaft 16 in the direction of A causes a rotation of output shaft 22 in direction C.

One-way clutch 30, then, serves as a hill hold when friction band 36 is engaged. By preventing the counter rotation of input shaft 16, which is tied to output shaft 22 through gear train 26, when friction band 36 is engaged, counter rotation of output shaft 22, opposite to the direction for which gear train 26 is in, is prevented. This will keep the vehicle from rolling backward when transmission 18 is maintained in a forward gear, and from rolling forward when transmission 18 is maintained in a reverse gear.

Bell crank 44 has a second arm 48 that is pivotally mounted to a pushrod 50. Push rod 50 has two components, a main push rod 52 and a secondary push rod 54. Secondary push rod 54 is the one that is pivotally mounted to bell crank 44. Secondary push rod 54 has a smaller diameter than main pushrod 52 and slips telescopically into a bore 56 within main pushrod 52. Main push rod 52 is also slidably retained by housing 20. Each portion of push rod 50 includes a flange portion 58, spaced from each other in their assembled positions. An overtravel spring 60 is retained between the two flange portions 58. If main push rod 52 is pushed toward secondary push rod 54, overtravel spring 60 will resist this movement.

A toggle link 62 is pivotally mounted to main push rod 52. Toggle link 62 is attached to two opposed centering springs 64 and pivotally attached to a friction pad 66 via hinge point 67. Friction pad 66 is held in surface contact with a disk 68 affixed to output shaft 22 by toggle link 62 and centering springs 64. Centering springs 64 are opposed such that the two attempt to pull toggle link 62 in line with push rod 50 so it lines up with push rod centerline 70. Toggle link 62 and centering springs 64 also limit the travel of friction pad 66 such that it can only move a limited distance along a substantially straight line path.

The frictional contact between friction pad 66 and disk 68 effectively acts as a rotational direction sensing mechanism. Disk 68 will tend to drag friction pad 66 in the direction of rotation, and, hence, the direction of rotation can be determined by the direction in which friction pad 66 is being dragged. Thus, movement of friction pad 66 can be used to actuate a mechanism dependent upon a change in direction of rotation of output shaft 22. Toggle link 62, push rod 50, bell crank 44 and friction band 36 can then act as a locking mechanism activated by the response of friction pad 66 to a change in rotational direction of output shaft 22.

The length of pushrod assembly 50 combined with the length of toggle link 62 is such that it is greater than the distance from output shaft disk 68 to bell crank second arm 48. Also, the spring force of overtravel spring 60 is high enough that when push rod 50 is causing bell crank 44 to engage friction band 36, friction band 36 can be fully engaged before overtravel spring 60 fully compresses. The reasons for these features will become apparent when describing the hill hold in operation.

In operation, if the vehicle is traveling forward, input shaft 16 is driven by engine 12 in the direction of A, which causes output shaft 22 to rotate in the direction of B. Friction pad 66 will be disposed in the direction of rotation B associated with forward movement of the vehicle, since it rubs on output shaft disc 68. It and toggle link 62 are restrained from further movement in the direction of rotation by centering springs 64. Centering springs 64 do not have a sufficient spring force to return toggle link 62 to pushrod centerline 70. As a result, pushrod 50 exerts minimal pressing force on bell crank 44 and, in turn, bell crank 44 is not tightening friction band 36 around outer member 34, as this minimal force is resisted by auxiliary spring 76. One-way clutch 30 is thus not engaged. When one-way clutch 30 is in an open position, it does not inhibit transmission input shaft 16 from rotating in either direction.

The condition of the vehicle being at rest facing up hill and beginning to roll down an incline in an unwanted direction can be indicated by a change in the direction of rotation of output shaft 22 from direction B to direction C. If the vehicle begins to roll down the incline while the gear train 26 is still in a forward gear, driven wheels 24 will attempt to roll down hill. This, in turn, will cause output shaft 22 to rotate in the opposite direction of that for forward travel, direction C. Disk 68 changes its direction of rotation, pulling friction pad 66 toward centerline 70 and causing toggle link 62 toward a fully extended position in alignment with push rod centerline 70, increasing the effective length of pushrod 50 and causing it to move in the direction of one-way clutch 30. Main pushrod 52 will, in turn, push secondary pushrod 54 into the bell crank 44, and cause bell crank 44 to pivot. As bell crank 44 pivots, it tightens friction band 36 around outer member 34 of one-way clutch 30. This prevents outer member 34 from rotating and causes one-way clutch 30 to be in an engaged or closed position. In effect, a reversal in direction of rotation of output shaft 22 is being sensed and is responded to by controlling engagement of one-way clutch 30 on input shaft 16.

One-way clutch 30 can now only rotate in direction A of the engine driven input shaft 16. Thus, should output shaft 22 try to rotate in the opposite direction C, input shaft 16, coupled to it through gear train 26, will not allow it to rotate in this direction, thus preventing the vehicle from rolling down hill when the driver removes his foot from the brake pedal to press on the accelerator pedal.

If the driver keeps the vehicle transmission in a forward gear and releases the manual clutch to move forward, one-way clutch 30 allows rotation of input shaft 16, and toggle link 62 will simply move down from its more centerline position to its original position it was in when the vehicle was moving forward, and input shaft rotation will not be inhibited.

If, on the other hand, the driver puts the vehicle transmission into reverse gear, input shaft 16 will be driven by engine 12 in the engine driven direction A, which one-way clutch 30 does not prevent, and output shaft 22 can now be driven in the opposite direction C without interference from the hill hold mechanism. This will cause toggle link 62 to jam friction pad 66 into disk 68 and pass over centerline 70. However, as it comes up to center, over-travel spring 60 will compress and allow toggle link 62 to pass over centerline 70 while limiting stress on the parts.

It is also desirable to allow the driver to shift from reverse to forward gears while the vehicle is still rolling slightly backward and vice versa without having one-way clutch 30 engage to stop the "wrong way" motion. By having friction band 36 normally unclamped from one-way clutch 30, allowing input shaft 16 to rotate freely in either direction, a driver can back the vehicle up and put the transmission in a forward gear before it has come to a complete stop without transmission input shaft 16 being locked up by one-way clutch 30, preventing stress on the transmission and allowing for a smooth transition from one direction to the other.

The overall hill hold mechanism 28, then, automatically prevents unwanted roll of a vehicle when stopped on an ascending grade before continuing on in the original direction of travel, yet does not resist the existing direction of motion. This mechanism will also account for careless drivers who do not come to a complete stop before changing gears to move in the opposite direction, as well as those who are stuck in snow or mud and wish to "rock" the vehicle back and forth by alternately supplying power while the transmission is switched from a forward to a reverse gear.

A disable mechanism can also be employed to loosen friction band 36 to release hill hold device 28 or to prevent engagement. Support and disable link 40 can be disengaged to prevent friction band 36 from tightening around outer member 34. A pivot point 72, between attachment to friction band 36 and housing 20 is included. By knocking support link 40 out of alignment, even if bell crank 44 is pressed against friction band 36, friction band 36 will not tighten around outer member 34. One-way clutch 30, then, cannot become engaged. A release mechanism 74 can be located outside of housing 20. Release mechanism 74 can be a cable, a hydraulic or an electric driver device.

In an alternate embodiment, the hill hold includes an electronic sensor, not shown, affixed in proximity to disk 68, having indications thereon, that senses a cessation of motion of output shaft 22. The sensor is connected to a control microprocessor, not shown, that induces a motor or other actuating mechanism to cause a tightening of friction band 36 around one-way clutch 30, and to release friction band 36 when output shaft 22 resumes its rotations as the vehicle begins moving again.

As a further alternate embodiment, outer member 34 of one-way clutch 30 can also be constrained by a cog wheel, not shown, attached to outer member 34 and an engaging dog, not shown, attached to transmission housing 20; and centering springs 64 can be replaced by a leaf spring, not shown, cantilevered from push rod 52.

While certain embodiments of the present invention have been described in detail, those familiar with the art to which this invention relates will recognize various alternative designs and embodiments for practicing the invention as defined by the following claims.

I claim:

1. A vehicle transmission comprising:

a housing having a gear train enclosed therein;

an input shaft protruding into the housing and coupled to the gear train for driving the gear train;

an output shaft protruding out of the housing and reversibly coupled to the input shaft through the gear train with the output shaft driven by the gear train;

disengageable clutch means, attached to the input shaft and operatively engaging the housing, for permitting rotation of the input shaft in only one direction when engaged, and in both directions when disengaged;

actuating means, coupled to the output shaft, for sensing a change in rotational direction of the output shaft; and locking means, operatively responsive to the actuating means, for selectively engaging the clutch means when the actuating means senses a change in rotational direction of the output shaft.

2. A transmission according to claim 1 wherein the clutch means includes an inner member and an outer member operatively engaging the inner member, with one of the inner and outer members operatively engaging the locking means and the other one of the inner and outer members secured to the input shaft.

3. A transmission according to claim 2 wherein the inner member is rotationally fixed relative to the input shaft and the outer member is coupled to the inner member such that the outer member can rotate in only one direction relative to the inner member.

4. A transmission according to claim 1 wherein the locking means comprises a toggle link pivotally coupled to the actuating means, a push rod pivotally coupled to the toggle link, a bell crank pivotally coupled to the push rod and also pivotally coupled to the transmission, and a friction band cooperating with the bell crank and mounted about the clutch means.

5. A transmission according to claim 1 wherein the actuating means includes a disk affixed to the output shaft and a friction pad in frictional contact with the disk and including a hinge point holding the friction pad such that it can only move a limited distance.

6. A transmission according to claim 5 wherein the locking means comprises a toggle link pivotally coupled to the friction pad through the hinge point, a push rod pivotally coupled to the toggle link, a bell crank pivotally coupled to the push rod and also pivotally coupled to the transmission, and a friction band cooperating with the bell crank and mounted about the clutch means, and the actuation means further includes a pair of centering springs mounted to the toggle link.

7. A transmission according to claim 6 wherein the clutch means includes an inner member, rotationally fixed relative to the input shaft, and an outer member, coupled to the inner member such that the outer member can rotate in only one direction relative to the inner member, with the outer member in surface contact with the friction band.

8. A transmission according to claim 6 wherein the push rod includes a main portion having a bore therein and a secondary portion mounted telescopically within the main portion, each portion having a flange, with the pushrod further including an overtravel spring mounted between the flanges.

9. A transmission according to claim 1 further comprising a disable mechanism coupled to the locking means for preventing the locking means from engaging the clutch means.

10. A transmission according to claim 9 wherein the clutch means includes an inner member, rotationally fixed relative to the input shaft, and an outer member, operatively engaging the inner member such that the outer member can rotate in only one direction relative to the inner member, and wherein the locking means includes a friction band in surface contact with the outer member, and wherein the disable mechanism includes a disable link affixed to the transmission at one end and affixed to the friction band at the other end and having a releasable pivot point located therebetween.

11. A vehicle transmission comprising:

a housing having a gear train enclosed therein;

an input shaft protruding into the housing and coupled to the gear train for driving the gear train;

a manual clutch connected to the opposite end of the input shaft from the gear train;

an output shaft protruding out of the housing and reversibly coupled to the input shaft through the gear train, with the output shaft driven by the gear train;

a one-way clutch, attached to the input shaft and operatively engaging the housing, having an engaged position such that the clutch will only allow the input shaft to rotate in one direction and a disengaged position such that the input shaft can rotate in either direction;

sensing means, cooperating with the output shaft, for sensing a change in rotational direction of the output shaft; and locking means for selectively causing the one-way clutch to be in its engaged position when the sensing means senses a change in rotational direction of the output shaft.

12. A transmission according to claim 11 wherein the one-way clutch includes an inner member, rotationally fixed relative to the input shaft, and an outer member, operatively engaging the inner member such that the outer member can rotate in only one direction relative to the inner member, with the outer member coupled to the locking means.

13. A transmission according to claim 11 wherein the locking means comprises a toggle link pivotally coupled to the sensing means, a push rod pivotally coupled to the toggle link, a bell crank pivotally coupled to the push rod and also pivotally coupled to the housing, and a friction band cooperating with the bell crank and mounted about the one-way clutch.

14. A transmission according to claim 11 wherein the sensing means includes a disk affixed to the output shaft and a friction pad in frictional contact with the disk and including a hinge point holding the friction pad such that it can only move a limited distance.

15. A transmission according to claim 11 further comprising a disable mechanism coupled to the locking means for preventing the locking means from engaging the one-way clutch.

16. A vehicle transmission having a hill holder mechanism, the transmission including a housing for rotatably supporting an input shaft having a driven direction of rotation and coupled to a vehicle engine, an output shaft coupled to vehicle drive wheels, and a gear train selectively interconnecting the input and output shafts, with the transmission shiftable between a forward and a reverse gear position, the hill hold mechanism comprising:

a releasable one-way clutch having an inner member rotationally fixed relative to the transmission input shaft and an outer member coupled to the inner member such that the inner member can rotate in only the driven direction relative to the outer member;

locking means coupled to the outer member and the housing and movable between a locked and an unlocked position for respectively locking and unlocking the one-way clutch such that the locking means prevents rotation of the outer member relative to the housing, causing the one-way clutch to permit rotation of the input shaft only in the driven direction when the locking means is in the locked position and the one-way clutch permits rotation of the input shaft in either direction when the locking means is in the unlocked position; and friction means, associated with the output shaft, for changing position when the output shaft reverses direction and thereby causing the locking means to move between the locked and the unlocked positions.

17. A transmission hill hold mechanism according to claim 16 wherein the locking means comprises a toggle link pivotally coupled to the friction means, a push rod pivotally coupled to the toggle link, a bell crank pivotally coupled to the push rod and also pivotally coupled to the housing and a friction band cooperating with the bell crank and mounted about the one-way clutch.

18. A transmission hill hold mechanism according to claim 16 wherein the friction means includes a disk affixed to the output shaft and a friction pad in frictional contact with the disk and including a hinge point holding the friction pad such that it can only move a limited distance.

19. A transmission hill hold mechanism according to claim 16 further comprising a disable mechanism coupled to the locking means for preventing the locking means from engaging the one-way clutch.

* * * * *